United States Patent [19]
Bradford

[11] Patent Number: 5,054,429
[45] Date of Patent: Oct. 8, 1991

[54] CAT SCRATCHING POST AND METHOD FOR MAKING A CAT SCRATCHING POST

[76] Inventor: Collins Bradford, 23914 Silversmith, Katy, Tex. 77449

[21] Appl. No.: 420,917

[22] Filed: Oct. 13, 1989

[51] Int. Cl.⁵ ............................................. A01K 15/00
[52] U.S. Cl. ................................................. 119/29
[58] Field of Search .......................... 119/1, 29, 29.5; 272/111, 112, 113

[56] References Cited

U.S. PATENT DOCUMENTS

| D. 254,813 | 4/1980 | Kossar | D30/99 |
| D. 255,610 | 6/1980 | Clarke-Fodor | D30/99 |
| 3,392,078 | 7/1968 | Duhl | 161/50 |
| 3,479,990 | 11/1969 | Crow | 119/1 |
| 3,479,991 | 11/1969 | Licthenberger | 119/1 |
| 3,482,548 | 12/1969 | Burns | 119/29 |
| 3,604,397 | 9/1971 | Salerno | 119/29 |
| 3,616,135 | 10/1971 | Tesalner | 161/63 |
| 4,177,763 | 12/1979 | Cook | 119/29 |
| 4,189,149 | 2/1980 | Katsiaficas | 272/113 |
| 4,497,279 | 2/1985 | Bell | 119/29 |
| 4,790,265 | 12/1988 | Manson | 119/29 |

Primary Examiner—Gene Mancene
Assistant Examiner—R. Thomas Price
Attorney, Agent, or Firm—Ben D. Tobor

[57] ABSTRACT

A cat scratching post for cats has an undulating configuration formed by portions of carpeting disposed in a spaced relationship from an underlying base member.

10 Claims, 2 Drawing Sheets

CAT SCRATCHING POST AND METHOD FOR MAKING A CAT SCRATCHING POST

1. FIELD OF THE INVENTION

The invention relates to a cat scratching post for cats, and a method for making cat scratching posts for cats.

2. DISCUSSION OF THE PRIOR ART

Cats have an inate desire to sharpen their claws on most household articles of furniture, which can seriously damage the cat owner's furniture. Cats also have an affinity for scratching woven pile carpet, to the extent of literally destroying selected areas of carpeting, whether wall-to-wall carpeting or area rugs. Cats also have the desire to climb all over their owner's furniture to either exercise themselves, or to find a suitable place to nap. Such climbing upon the cat owner's furniture can also cause serious damage to the cat owner's furniture.

Various types and shapes of cat scratching posts have been developed, so as to encourage the cat to sharpen its claws upon such posts, as well as lay upon the posts. Representative examples of such prior art cat scratching posts are: U.S. Pat. No. 254,813, issued to Gary R. Kossar; U.S. Pat. No. 255,610, issued to Sharon Clarke-Fodor; and U.S. Pat. No. 4,790,265, issued to Blair R. Manson. Each of the foregoing prior art cat scratching posts utilizes a layer of woven pile-like material, such as floor carpet material disposed upon, and secured to, a base member in a close fitting relationship thereto. It is believed that the intent of such prior art cat scratching posts is to encourage the cat to sharpen its claws against such structure, as well as lay upon such structure, rather than the cat owner's furniture. Typically, such prior art cat scratching posts are placed in the room which contains the furniture which the cat owner desires to protect by encouraging the cat to use these cat scratching posts.

In general, such prior art cat scratching posts have colors, shapes and textures which are considered by many cat owners to be dull and unimaginative, and do not easily attract the desired attention of the cat. While not attracting the desired attention of, and use by, the cat, the unattractive design of these devices does attract the undesired attention of people entering the room which has the cat scratching post disposed therein. It is also believed that the manner in which the carpet material is placed upon its underlying support member, which is typically accomplished by nailing, tacking, or glueing the carpet material flat against the support member, contributes to the carpet material becoming quickly frayed from the scratching of the cat. It is further believed that the manner of attaching the carpet material does not provide the cat with a good surface to climb upon, in that the cat does not get very good leverage in holding onto the flat, stiff, carpeted surface.

Accordingly, prior to the development of the present invention, there has been no cat scratching post, or method for making cat scratching posts which: is aesthetically pleasing and desirable to both the cat and the cat owner; effectively competes with the furniture to be protected within a room for the cat's attention; is designed to resist fraying of the carpet material used to make the cat scratching post; and provides a surface for the cat to obtain better leverage when climbing upon the cat scratching post. Therefore, the art has sought a cat scratching post and method for making a cat scratching post which: has been designed to be aesthetically pleasing and desirable to the cat and cat owner; effectively competes with the furniture sought to be protected for the cat's attention; is designed to resist rapid fraying of the carpet material used in the manufacture of the cat scratching post; and provides a climbing surface which gives the cat better leverage while climbing upon the cat scratching post.

SUMMARY OF THE INVENTION

In accordance with the invention, the foregoing advantages have been achieved through the present cat scratching post for cats. The cat scratching post of the present invention includes: a base member, having an outer surface; and at least one layer of woven, pile-like material, having top and bottom surfaces, disposed upon at least a portion of the outer surface of the base member, portions of the bottom surface of the woven, pile-like material being disposed in a spaced relationship from the outer surface of the base member, whereby portions of the top surface of the woven pile-like material have an undulating configuration.

A further feature of the present invention is that portions of the bottom surface of the wove pile-like material may be fixedly secured to the outer surface of the base member, and the portions of woven pile-like material which have their bottom surfaces spaced from the outer surface of the base member are capable of movement upon being contacted by a cat.

A further feature of the present invention is that at least one cavity may be formed and defined by the outer surface of the base member and the portions of the bottom surface of the woven pile-like material which are spaced outwardly from the outer surface of the base member. Another feature of the present invention is that the at least one cavity may have a resilient material disposed therein to maintain the spaced relationship between the bottom surface of the portions of woven pile-like material and the outer surface of the base member. The resilient material may be small strips of the woven pile-like material, and the strips may be folded upon themselves.

In accordance with the present invention, the foregoing advantages have also been achieved through the present method for making cat scratching posts. The present invention includes the steps of disposing at least one layer of a woven, pile-like material, having a top and bottom surface upon a base member having an outer surface; and forming portions of the woven pile-like material into an undulating configuration by disposing portions of the bottom surface of the woven pile-like material in a spaced relationship from the outer surface of the base member. Another feature of the present invention includes the steps of fixedly securing portions of the bottom surface of the woven pile-like material to the outer surface of the base member, and disposing the portions of the woven pile-like material, which have their bottom surfaces spaced from the outer surface of the base member, so that those spaced portions are capable of movement upon being contacted by a cat. A further feature of the present invention includes the step of forming at least one cavity defined by the outer surface of the base member and the portions of the bottom surface of the woven pile-like material which are spaced from the outer surface of the base member. Another feature of the present invention includes the step of disposing resilient material within the at least one cavity to maintain the spaced relationship between the bottom surface of the portions of woven pile-like material and the outer surface of the base member. The resilient material may be small strips of the woven pile-like material, and the strips may be folded upon themselves.

The cat scratching posts and method for making cat scratching posts of the present invention, when compared with previously proposed prior art cat scratching posts and methods for making them, have the advantages of: being aesthetically pleasing to both the cat and the cat owner; provides a better surface for the cat to climb upon; effectively competes with the furniture sought to be protected for the cat's attention; and helps to decrease the amount of fraying of the carpet or woven pile-like material.

BRIEF DESCRIPTION OF THE DRAWINGS

In the drawings.

PIG. 6 is a front view of the upper end of the cat scratching post of FIG. 1, illustrating its manufacture.

While the invention will be described in connection with the preferred embodiment, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Figure 1:
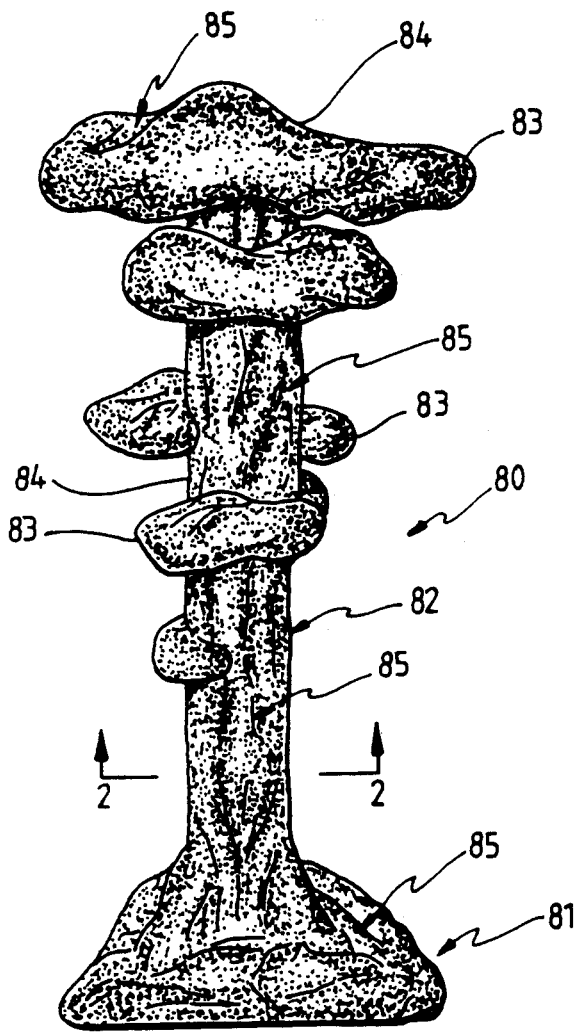
FIG. 1 is a front elevation view of a cat scratching post in accordance with the present invention.

In FIG. 1, a cat scratching post 80 in accordance with the present invention is shown in the configuration of a fanciful tree having a base portion 81, trunk portion 82, and leaf portions 83. Although cat scratching post 80 of the present invention as illustrated is in the form of a fanciful tree, cat scratching post 80 of the present invention can be made to fancifully resemble other objects, such as mountains, houses, bushes, or any geometric or abstract shape, such as triangles, cones, pyramids, semi-circles, crescents, rectangles, etc. Cat scratching post 80 generally includes at least one layer of woven pile-like material 84, which material is preferably standard carpet material. It should be understood that the woven pile-like material 84, could be carpet made of either natural or synthetic fibers, as well as any other material having the look, feel, and strength and flexibility characteristics of a woven pile-like material, such as standard carpet material. As will be hereinafter described in greater detail, the at least one layer of woven pile-like material 84 has been disposed to form cat scratching post 80, whereby an undulating configuration, such as shown at 85, of woven pile-like material is formed. By use of the term "undulating configuration" is meant that the at least one layer of woven pile-like material 84 has a wavy, undulating, or wrinkled configuration 85, as will be hereinafter described in further detail.

Figure 2:
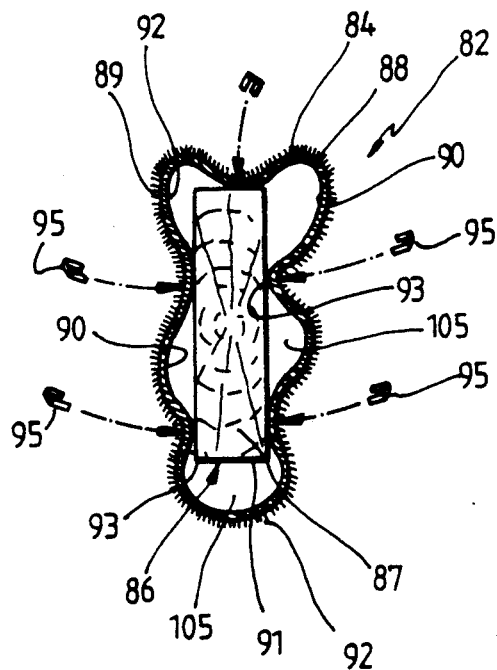
FIG. 2 is a cross-sectional view of the cat scratching post of FIG. 1 taken along line 2—2 of FIG. 1.

With reference to FIG. 2, it is seen that cat scratching post 80 includes a base member 86, and the at least one layer of woven pile-like material 84 is disposed upon base member 86. Preferably, base member 86 is a piece of wood having a shape and configuration generally corresponding to the desired shape of the cat scratching post 80. For the trunk portion 82 of cat scratching post 80, base member 86 could be a rectangular shaped board 87 having the rectangular cross-sectional configuration illustrated in FIG. 2. As previously discussed, for a fancifully shaped mountain type cat scratching post 80, base member 86 could be a triangular shaped board having the cross-sectional configuration illustrated in FIG. 2. Other materials could be used for base member 86, such as Masonite ®, chip board, plywood, laminates of any of the foregoing, or laminates of cardboard material, provided the base member 86 has the requisite strength characteristics necessary to support the woven pile-like material 84, as well as support the weight of a cat (not shown) which would likely climb up, and upon, cat scratching post 80, such as by climbing up trunk portion 82 and laying upon the leaf portions 83 of cat scratching post 80 (FIG. 1).

Figure 3:
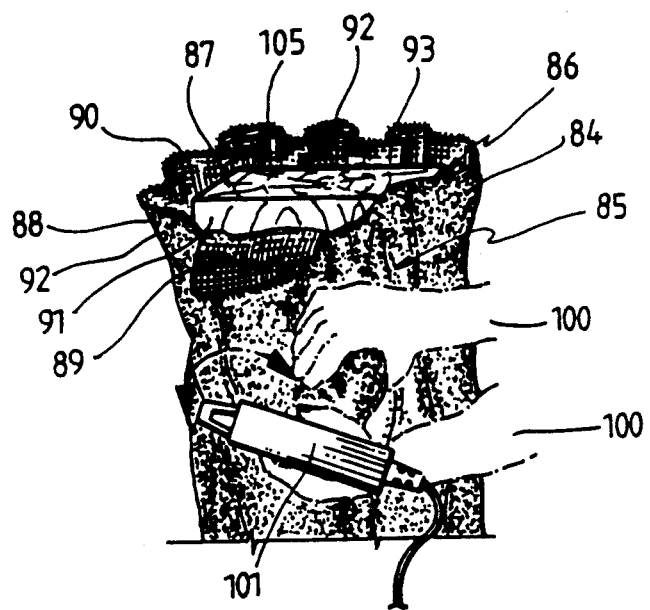
FIG. 3 is a front view of the top end of the cat scratching post of FIG. 1, while it is being made.

With reference to FIGS. 2 and 3, woven pile-like material 84 has top and bottom surfaces 88,89, and portions 90 of the bottom surface 89 of the woven pile-like material 84 are disposed in a spaced relationship from the outer surface 91 of base member 86, whereby portions 92 of the top surface 88 of the carpet material 84 have the undulating configuration 85 previously described. Portions of 93 of the bottom surface 89 of carpet material 84 are fixedly secured to the outer surface 91 of base member 86, as by staples 95. Because of the spaced relationship of portions 90 of the bottom surface 89 of the woven carpet material 84, and the flexibility of the carpet material 84, the portions 92 of the top surface 88 of the woven pile-like material 84 are capable of movement upon being contacted by a cat (not shown), as the cat climbs upwardly and moves over the cat scratching post 80, and particularly as the cat climbs up the vertical trunk portion 82 of cat scratching post 80. It has been found that the wrinkled or undulating configuration 85 of carpet material 84 provides a surface which may be easily climbed and grasped, by the cat. Furthermore, the moveable surface 92, (since it moves upon being clawed at by the cat) resists fraying of the carpet material 84.

As shown in FIG. 3, cat scratching post 80 may have the portions 92 of the top surface 88 of the woven carpet material 84 formed into undulating configuration 85 by having a person grasp with his or her hands 100 carpet material 84 to cause undulating configuration 85 to be formed by portions 90 of the bottom surfaces 89 of the carpet material 84 to be disposed in a spaced relationship from the outer surface 91 of the base member 86. While carpet material 84 is grasped by hands 100, in the manner previously described, a conventional stapling gun 101 may be utilized to place staples 95 in portions 93 of carpet 84 to fixedly secure portions 93 of the bottom surface 89 of carpet material 84 to the outer surface 91 of base member 86. Instead of conventional stapling gun 101, a conventional hammer could be utilized to place nails or tacks (not shown) to be used in lieu of staples 95 to dispose them in the positions shown in FIGS. 2 and 3. Alternatively, a suitable glue or epoxy material could be placed upon portions 93 of the bottom surface 89 of the carpet material 84 so as to fixedly secure those portions 93 to the outer surface 91 of base member 86.

Still with reference to FIGS. 2-3, it is seen that at least one cavity 105 is formed and defined by the outer surface 91 of the base member 86 and the portions 90 of the bottom surface 89 of the carpet material 84 which are disposed in a spaced relationship from the outer surface 91 of base member 86. As seen in FIG. 2, preferably a plurality of cavities 105 are formed as previously described.

Figure 4:
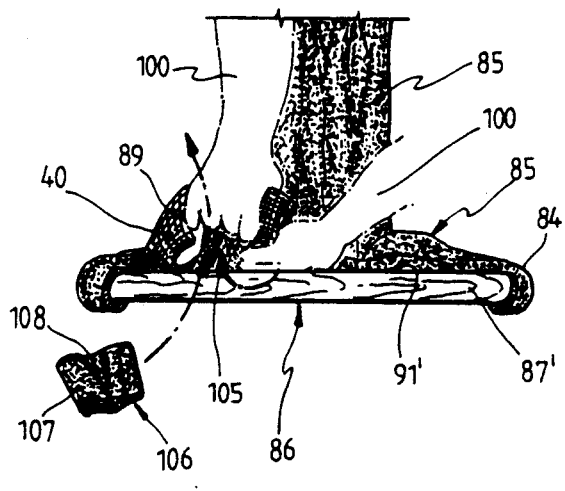
FIG. 4 is a front view of the lower end of the cat scratching post of FIG. 1, illustrating its manufacture.
Figure 5:
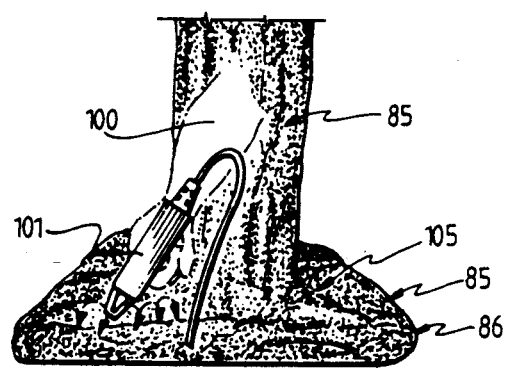
FIG. 5 is a front view of the lower end of the cat scratching post of FIG. 1, illustrating its manufacture.

With reference to FIGS. 4 and 5, the base portion 81 of cat scratching post 80 is illustrated to be made in substantially the same manner as the trunk portion 82 of cat scratching post 80. In FIGS. 4-5, as well as FIGS. 6-7, identical reference numerals are used for the same components, and primed reference numerals are utilized for those components which are similar in construction. Still with reference to FIGS. 4-5, base portion 81 of cat scratching post 80 includes a base member 86 formed of a board, or boards, 87' which has at least one layer of carpet material 84 disposed thereon, as previously described.

As with trunk portion 82 of cat scratching post 80, a plurality of cavities 105 are formed and defined by the outer surface 91' of base member 86 and the portions 90 of the bottom surface 89 of the carpet material 84 which are disposed in a spaced relationship from the outer surface 91' of base member 86. The undulating configuration 85 of carpet 84 of base portion 81 of cat scratching post 80 is also formed in the same manner as that previously described for trunk portion 82 of cat scratching post 80, in that portions of the carpet material 84 are stapled to base member 86, while other portions of carpet material 84 are disposed in a spaced relationship from base member 86. Since a cat may desire to lay, or walk upon, the base portion 81 of cat scratching post 80, the at least one cavity 105 formed, may have resilient material 106 disposed therein to maintain the spaced relationship between the bottom surface 89 of the portions 90 of the carpet material 84 and the outer surface 91' of the base member 86. Preferably, resilient material 106 may be small strips 107 of carpet material 84 which are folded upon themselves, as at 108. Prior to the carpet material 84 being stapled, or otherwise fixedly secured, to the base member 86 in an undulating configuration 85, the resilient material 106 is inserted within cavity 105 as shown in FIG. 4. It should be readily understood to one of ordinary skill in the art, that other types of resilient material 106 could be utilized other than small strips 107 of carpet material 84, such as pieces of foam rubber, crumpled cardboard, or other suitable material which can assist in maintaining the desired spaced relationship between carpet 84 and base member 86, as previously described.

Figure 6:
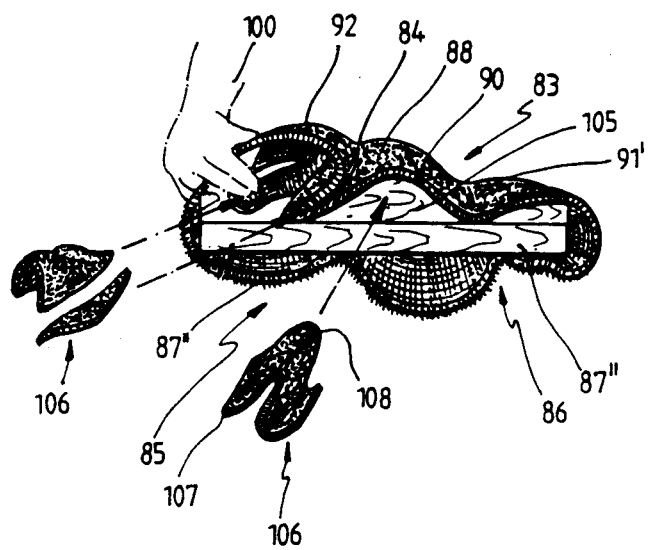
Figure 7:
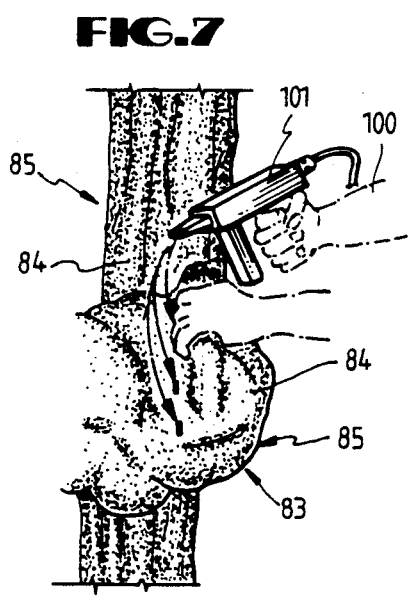
FIG. 7 is a front view of the central portion of the cat scratching post of FIG. 1, illustrating its manufacture.

With reference now to FIGS. 6 and 7, it is seen that leaf portions 83 of cat scratching post 80 are formed in the same manner as base portion 81 of cat scratching post 80. Leaf portions 83 may also be a convenient resting spot for a cat, whereby resilient material 106 or strips 107 of carpet material 84 folded about themselves as at 108 are placed within cavities 105 to help maintain the spaced relationship of carpet portions 90 from the outer surface 91' of base member 86. As seen in FIG. 6, base member 86 may comprise a plurality of boards 87" joined to one another as by gluing or nailing.

It is to be understood that the invention is not limited to the exact details of construction, operation, exact materials or embodiment shown and described, as obvious modifications and equivalents will be apparent to one skilled in the art; for example, different colored layers of carpet could be used either adjacent to one another or disposed over one another. Accordingly, the invention is therefore to be limited only by the scope of the appended claims.

I claim:

1. A cat scratching post for cats comprising:
   a base member having an outer surface and defining a post structure; and
   at least one layer of woven pile-like material, having top and bottom surfaces, disposed upon at least a portion of the outer surface of the base member, portions of the bottom surface of the woven pile-like material being disposed in a spaced relationship from the outer surface of the base member and portions of the bottom surface of the woven pile-like material being fixedly secured to the outer surface of the base member, whereby portions of the top surface of the woven pile-like material have an undulating configuration.

2. The cat scratching post of claim 1, wherein the portions of woven pile-like material which have been their bottom surface spaced from the outer surface of the base member are capable of movement upon being contacted by the cat.

3. The cat scratching post of claim 1, wherein at least one cavity is formed and defined by the outer surface of the base member and the portions of the bottom surface of the woven pile-like material which are spaced outwardly from the outer surface of the base member.

4. The cat scratching post of claim 3, wherein the at least one cavity has resilient material disposed therein to maintain the spaced relationship between the bottom surface of the portions of woven pile-like material and the outer surface of the base member.

5. The cat scratching post of claim 4, wherein the resilient material is small strips of the woven pile-like material, the strips being folded upon themself.

6. A method for making cat scratching posts for cats comprising the steps of:
   disposing at least one layer of a woven pile-like material, having a top and bottom surface, upon a base member having an outer surface and defining a post structure; and
   forming portions of the woven pile-like material into an undulating configuration by disposing portions of the bottom surface of the woven pile-like material in a spaced relationship from the outer surface of the base member and securing portions of the bottom surface of the woven pile-like material to the outer surface of the base member.

7. The method of claim 6, including the step of fixedly disposing the portions of the woven pile-like material which have their bottom surface spaced from the outer surface of the base member, so that those spaced portions are capable of movement upon being contacted by a cat.

8. The method of claim 6, including the step of forming at least one cavity defined by the outer surface of base member and the portions of the bottom surface of the woven pile-like material which are spaced from the outer surface of the base member.

9. The method of claim 8, including the step of disposing resilient material within the at least one cavity to maintain the spaced relationship between the bottom surface of the portions of woven pile-like material and the outer surface of the base member.

10. The method of claim 9 wherein small strips of the woven pile-like material is utilized as the resilient material and the strips are folded upon themself.

* * * * *